(12) United States Patent
Cheng et al.

(10) Patent No.: US 10,289,471 B2
(45) Date of Patent: May 14, 2019

(54) RANKING CAUSAL ANOMALIES VIA TEMPORAL AND DYNAMICAL ANALYSIS ON VANISHING CORRELATIONS

(71) Applicant: NEC Laboratories America, Inc., Princeton, NJ (US)

(72) Inventors: Wei Cheng, Plainsboro, NJ (US); Kai Zhang, Monmouth Junction, NJ (US); Haifeng Chen, West Windsor, NJ (US); Guofei Jiang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 163 days.

(21) Appl. No.: 15/420,949

(22) Filed: Jan. 31, 2017

(65) Prior Publication Data
US 2017/0228277 A1   Aug. 10, 2017

Related U.S. Application Data

(60) Provisional application No. 62/292,383, filed on Feb. 8, 2016.

(51) Int. Cl.
*G06F 11/00*    (2006.01)
*G06F 11/07*    (2006.01)
*G06N 20/00*    (2019.01)

(52) U.S. Cl.
CPC ........ *G06F 11/079* (2013.01); *G06F 11/0709* (2013.01); *G06F 11/0751* (2013.01);
(Continued)

(58) Field of Classification Search
CPC .................................................... G06F 11/079
See application file for complete search history.

(56) References Cited

U.S. PATENT DOCUMENTS

| 2005/0157800 | A1* | 7/2005 | Kim ..................... H04N 19/159 375/240.27 |
| 2008/0228459 | A1* | 9/2008 | Jiang ..................... H04L 41/145 703/13 |

(Continued)

OTHER PUBLICATIONS

Chen, et al., "Exploiting Local and Global Invariants for the Management of Large Scale Information Systems", 2008 Eighth IEEE International Conference on Data Mining.
(Continued)

*Primary Examiner* — Christopher S McCarthy
(74) *Attorney, Agent, or Firm* — Joseph Kolodka (57) ABSTRACT

A method is provided for root cause anomaly detection in an invariant network having a plurality of nodes that generate time series data. The method includes modeling anomaly propagation in the network. The method includes reconstructing broken invariant links in an invariant graph based on causal anomaly ranking vectors. Each broken invariant link involves a respective node pair formed from the plurality of nodes such that one of the nodes in the respective node pair has an anomaly. Each causal anomaly ranking vector is for indicating a respective node anomaly status for a given one of the plurality of nodes when paired. The method includes calculating a sparse penalty of the casual anomaly ranking vectors to obtain a set of time-dependent anomaly rankings. The method includes performing temporal smoothing of the set of rankings, and controlling an anomaly-initiating one of the plurality of nodes based on the set of rankings.

17 Claims, 4 Drawing Sheets

(52) U.S. Cl.
CPC ....... *G06N 20/00* (2019.01); *G06F 2201/805* (2013.01); *G06F 2201/81* (2013.01)

(56) References Cited

U.S. PATENT DOCUMENTS

| | | | | |
|---|---|---|---|---|
| 2009/0292954 | A1* | 11/2009 | Jiang | G06F 11/0709 |
| | | | | 714/47.2 |
| 2014/0047279 | A1* | 2/2014 | Sharma | G06F 11/079 |
| | | | | 714/39 |
| 2014/0350779 | A1* | 11/2014 | Yasue | G01M 17/00 |
| | | | | 701/32.8 |
| 2017/0010931 | A1* | 1/2017 | Agarwal | G06F 11/079 |
| 2017/0228277 | A1* | 8/2017 | Cheng | G06F 11/0709 |
| 2018/0067831 | A1* | 3/2018 | Cheng | G06N 99/005 |
| 2018/0131560 | A1* | 5/2018 | Cheng | H04L 41/0631 |
| 2018/0241654 | A1* | 8/2018 | Danichev | H04L 43/0823 |

OTHER PUBLICATIONS

Ge, et al., "Ranking Metric Anomaly in Invariant Networks", ACM Transactions on Knowledge Discovery from Data, May 2014, vol. 8, No. 2, Article 8, pp. 1-30.

Jiang, et al., "Efficient and Scalable Algorithms for Inferring Likely Invariants in Distributed Systems", IEEE Transactions on Knowledge and Data Engineering, Nov. 2007, vol. 19, No. 11, pp. 1508-1523.

Jiang, et al., "Modeling and Tracking of Transaction Flow Dynamics for Fault Detection in Complex Systems", IEEE Transactions on Dependable and Secure Computing, Oct.-Dec. 2006, vol. 3, No. 4, pp. 312-327.

Jiang, et al., "Discovering Likely Invariants of Distributed Transaction Systems for Autonomic System Management", Cluster Comput (2006), Accepted Jun. 2006 9:385-399.

* cited by examiner

RANKING CAUSAL ANOMALIES VIA TEMPORAL AND DYNAMICAL ANALYSIS ON VANISHING CORRELATIONS

RELATED APPLICATION INFORMATION

This application claims priority to U.S. Provisional Pat. App. Ser. No. 62/292,383 filed on Feb. 8, 2016, incorporated herein by reference in its entirety.

BACKGROUND

Technical Field

The present invention relates to computer learning and more particularly to ranking causal anomalies via temporal and dynamical analysis on vanishing correlations.

Description of the Related Art

With the rapid advances in networking and computing technology, we are facing an explosive growth of complexity in networked applications and information services. These large-scale information systems usually include thousands of components. Thus, there is a need to automatically monitor the system status, detect anomalies, and diagnose system fault in these large scale information systems. This will be very useful in facilitating human decision making in equipment and system maintenance and debugging.

SUMMARY

According to an aspect of the present invention, a computer-implemented method is provided for root cause anomaly detection in an invariant network having a plurality of nodes that generate time series data. The method includes modeling, by a processor, anomaly propagation in the invariant network. The method further includes reconstructing, by the processor, broken invariant links in an invariant graph based on causal anomaly ranking vectors. Each of the broken invariant links involves a respective node pair formed from the plurality of nodes such that one of the nodes in the respective node pair has an anomaly. Each of the causal anomaly ranking vectors is for indicating a respective node anomaly status for a given one of the plurality of nodes when paired. The method also includes calculating, by the processor, a sparse penalty of the casual anomaly ranking vectors to obtain a set of time-dependent anomaly rankings. The method additionally includes performing, by the processor, temporal smoothing of the set of time-dependent anomaly rankings. The method further includes controlling, by the processor, an anomaly-initiating one of the plurality of nodes based on the set of time-dependent anomaly rankings.

According to another aspect of the present invention, a computer program product is provided for root cause anomaly detection in an invariant network having a plurality of nodes that generate time series data. The computer program product includes a non-transitory computer readable storage medium having program instructions embodied therewith. The program instructions are executable by a computer to cause the computer to perform a method. The method includes modeling, by a processor, anomaly propagation in the invariant network. The method further includes reconstructing, by the processor, broken invariant links in an invariant graph based on causal anomaly ranking vectors. Each of the broken invariant links involves a respective node pair formed from the plurality of nodes such that one of the nodes in the respective node pair has an anomaly. Each of the causal anomaly ranking vectors is for indicating a respective node anomaly status for a given one of the plurality of nodes when paired. The method also includes calculating, by the processor, a sparse penalty of the casual anomaly ranking vectors to obtain a set of time-dependent anomaly rankings. The method additionally includes performing, by the processor, temporal smoothing of the set of time-dependent anomaly rankings. The method further includes controlling, by the processor, an anomaly-initiating one of the plurality of nodes based on the set of time-dependent anomaly rankings.

According to yet another aspect of the present invention, a computer processing system is provided for root cause anomaly detection in an invariant network having a plurality of nodes that generate time series data. The system includes a processor. The processor is configured to model anomaly propagation in the invariant network. The processor is further configured to reconstruct broken invariant links in an invariant graph based on causal anomaly ranking vectors. Each of the broken invariant links involves a respective node pair formed from the plurality of nodes such that one of the nodes in the respective node pair has an anomaly. Each of the causal anomaly ranking vectors is for indicating a respective node anomaly status for a given one of the plurality of nodes when paired. The processor is also configured to calculate a sparse penalty of the casual anomaly ranking vectors to obtain a set of time-dependent anomaly rankings. The processor is additionally configured to perform temporal smoothing of the set of time-dependent anomaly rankings. The processor is further configured to control an anomaly-initiating one of the plurality of nodes based on the set of time-dependent anomaly rankings.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to ranking causal anomalies via temporal and dynamical analysis on vanishing correlations.

Detecting anomalies in monitoring data from distributed information systems and cyber-physical systems is a vital task with numerous applications in areas such as industry, security, and health care. Discovering invariant relationships among the monitoring data and generate invariant networks has been demonstrated as an effective way to characterize relationships between system components. In the invariant network, a node is a monitoring data and a link indicates a correlation relationship between two monitoring data. Such an invariant network can help system experts to spot anomalies and diagnose system faults by examining those vanishing correlations.

In an embodiment of the present invention, a random walk (or network propagation) based framework is proposed for causal anomaly ranking, in order to identify important, causal anomalies in the invariant network and provide their relative importance in terms of the probability of being the root cause of the system malfunction.

Figure 1:
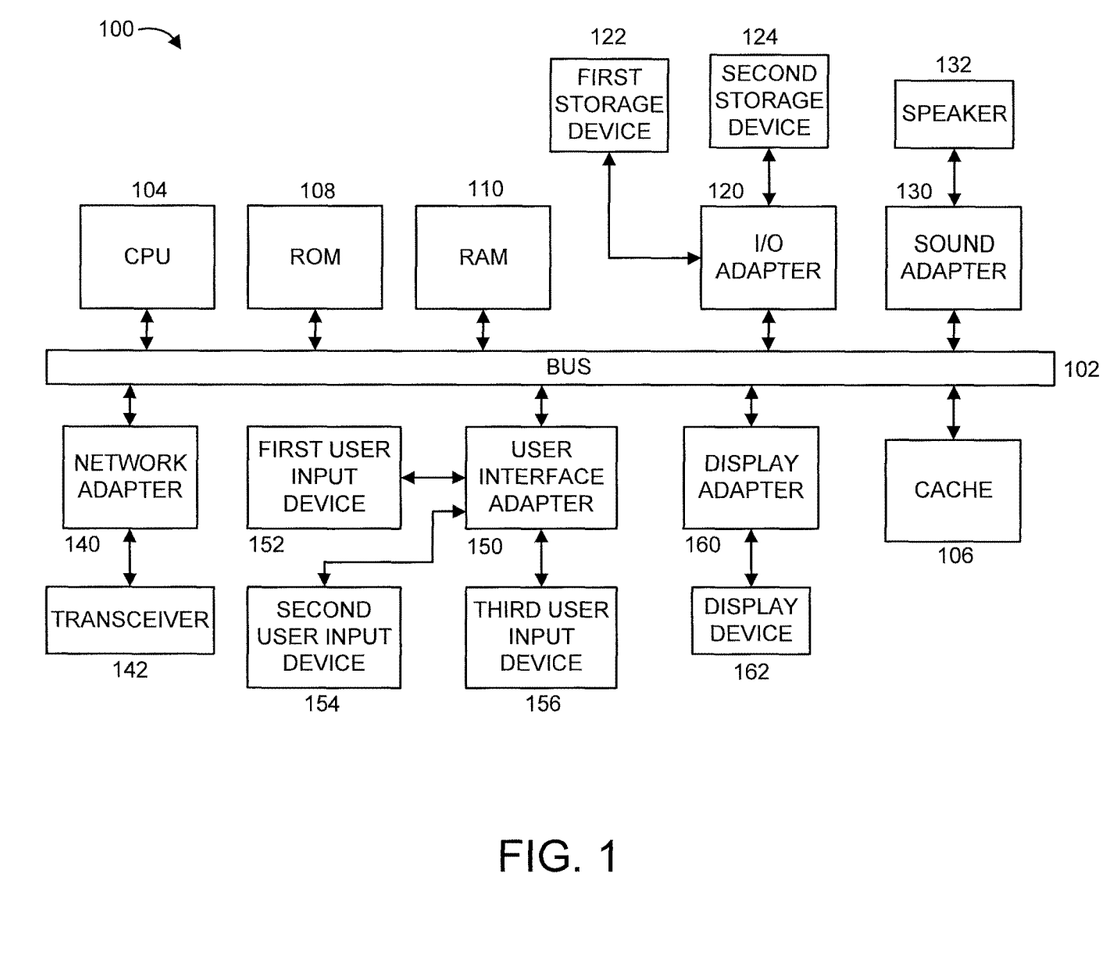
FIG. 1 shows a block diagram of an exemplary processing system 100 to which the present invention may be applied, in accordance with an embodiment of the present invention.

First, we take as input the invariance graph as well as the broken pairs of the invariance graph. Then, we use the random walk model to estimate the propagation of the true, causal anomalies in the invariance graph. Thereafter, we use an optimization framework which has the following two terms: (1) minimize the number of true anomalies in the graph, since based on prior knowledge the system anomaly or failure is usually triggered by a limited number of "seed" anomalies; and (2) the propagated anomalies from the seeds should be consistent with the broken edges provided in the invariance graph, by minimizing their reconstruction error. We have designed an iterative optimization procedure to obtain a local optimal solution FIG. 1 shows a block diagram of an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
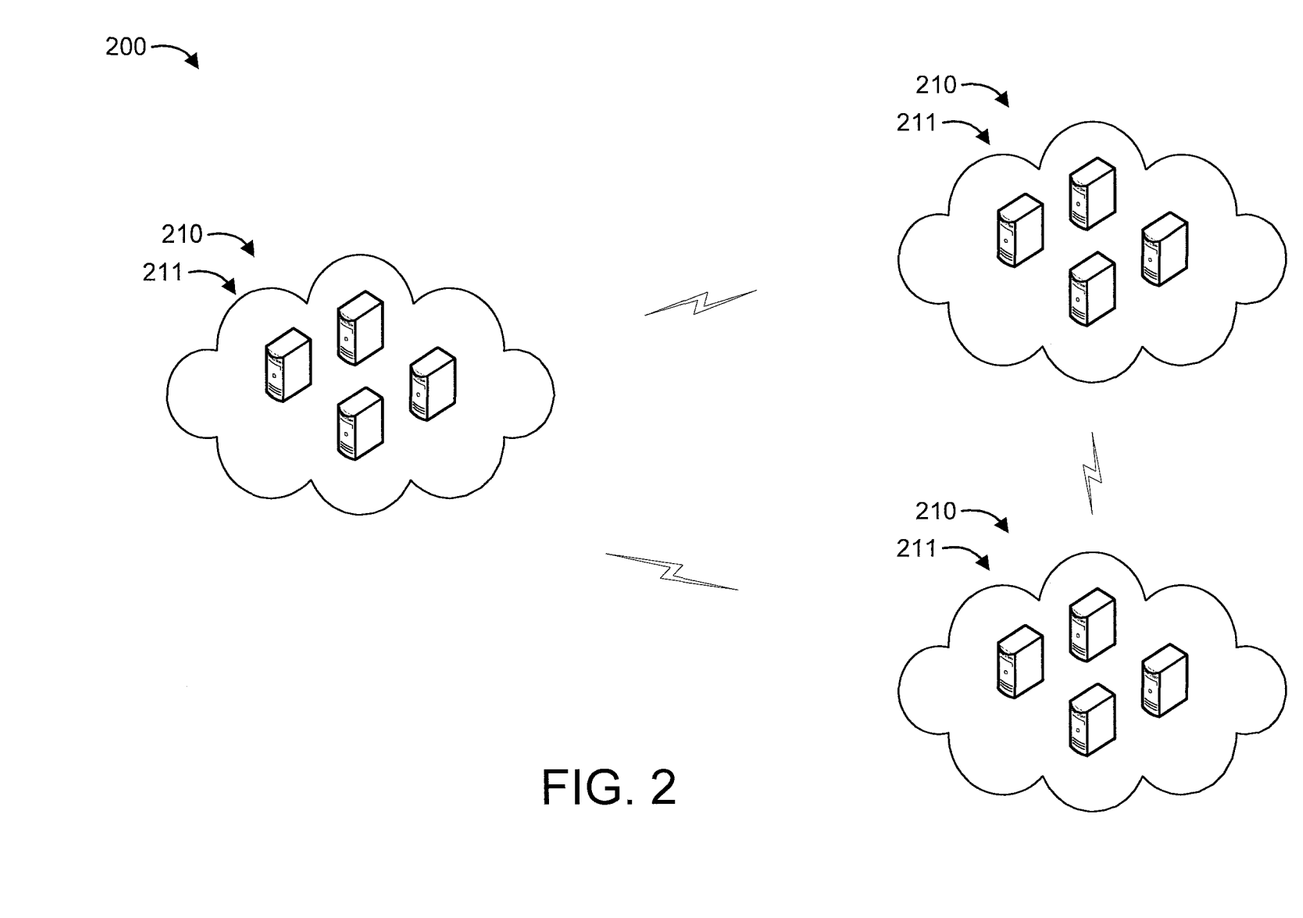
FIG. 2 shows a block diagram of an exemplary environment 200 to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
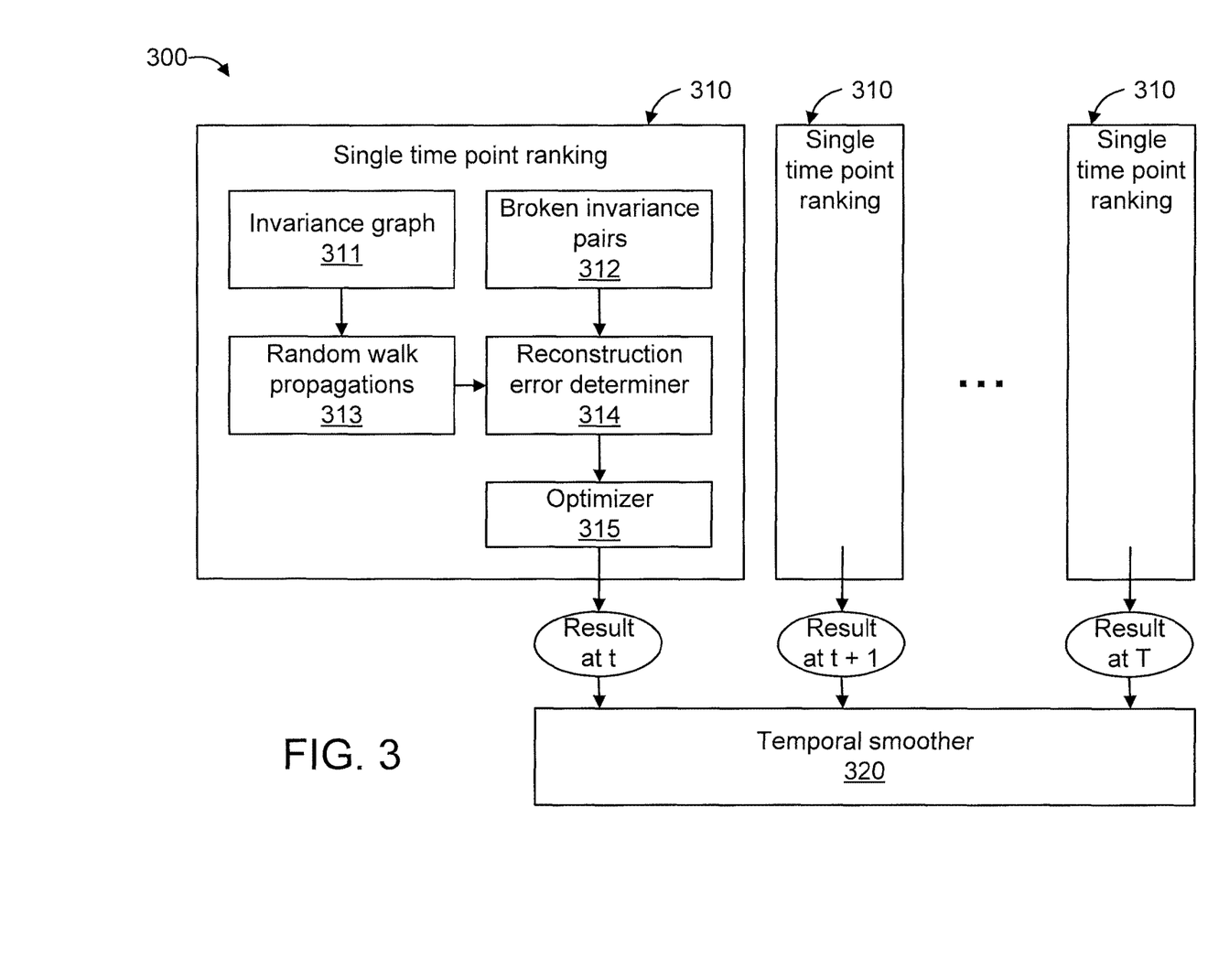
FIG. 3 shows a high-level block/flow diagram of an exemplary causal anomaly ranking system/method 300, in accordance with an embodiment of the present invention.

Also, it is to be appreciated that system 300 described below with respect to FIG. 3 is a system for implementing respective embodiments of the present invention. Part or all of processing system 100 may be implemented in one or more of the elements of system 300.

Figure 4:
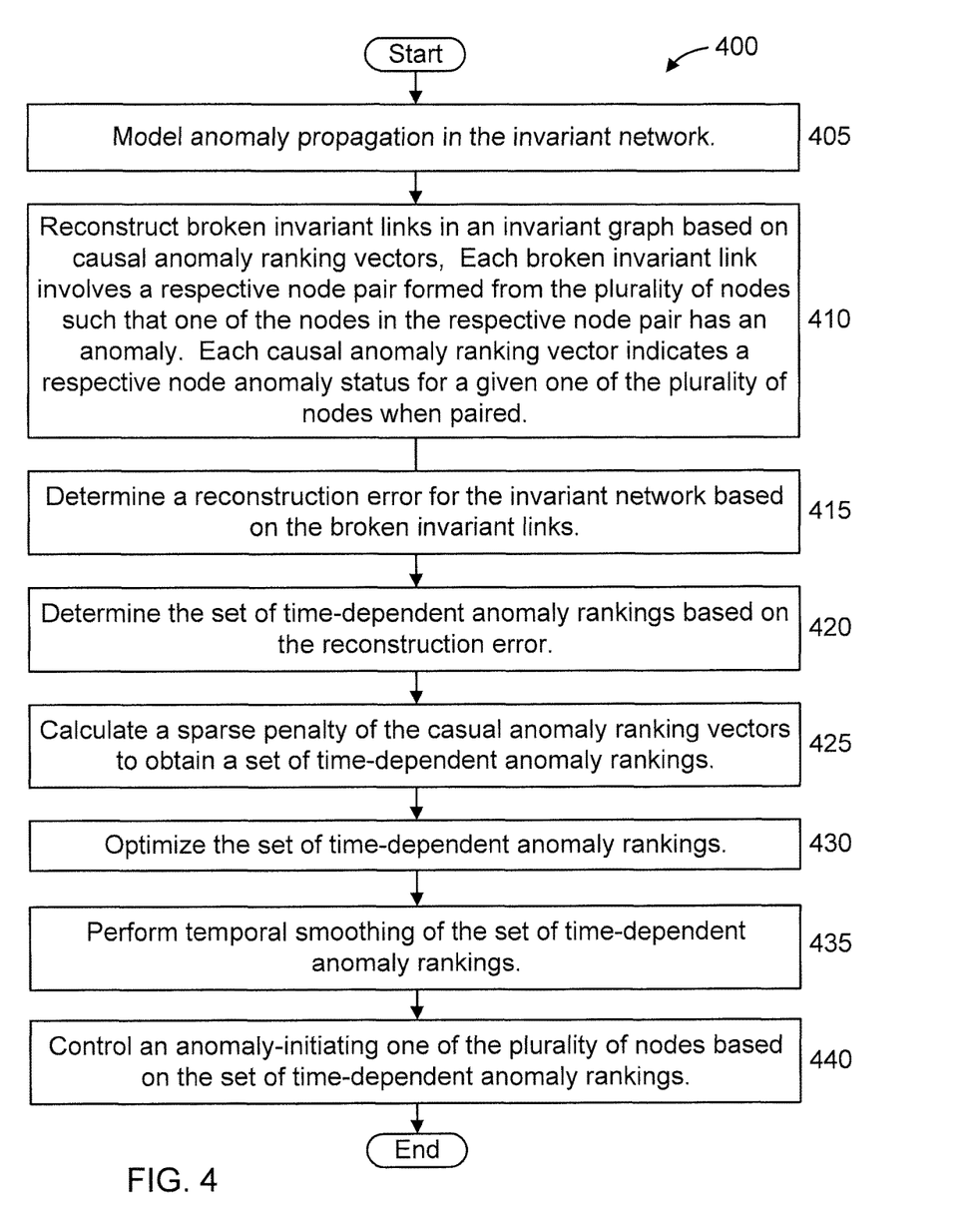
FIG. 4 shows a flow diagram of an exemplary method 400 for causal anomaly ranking, in accordance with an embodiment of the present invention.

Further, it is to be appreciated that processing system 100 may perform at least part of the method described herein including, for example, at least part of method 400 of FIG. 4. Similarly, part or all of environment 200 may be used to perform at least part of method 400 of FIG. 4. Additionally, part or all of system 300 may be used to perform at least part of method 400 of FIG. 4.

FIG. 2 shows a block diagram of an exemplary environment 200 to which the present invention can be applied, in accordance with an embodiment of the present invention. The environment 200 is representative of an invariant computer network to which the present invention can be applied. The elements shown relative to FIG. 2 are set forth for the sake of illustration. However, it is to be appreciated that the present invention can be applied to other network configurations as readily contemplated by one of ordinary skill in the art given the teachings of the present invention provided herein, while maintaining the spirit of the present invention.

The environment 200 at least includes a set of nodes, individually and collectively denoted by the figure reference numeral 210. Each of the nodes 210 can include one or more servers or other types of computer processing devices, individually and collectively denoted by the figure reference numeral 211. The computer processing devices 211 can include, for example, but are not limited to, machines (e.g., industrial machines, assembly line machines, robots, etc.) and so forth. For the sake of illustration, each of the nodes 210 is shown with a set of servers 211. Each of the nodes generates and/or otherwise provides time series data.

In an embodiment, the present invention ranks causal anomalies in the network via temporal and dynamic analysis on vanishing correlations, as described herein. Based on the ranks, a computer processing system can be controlled in order to mitigate errors stemming from propagation of a causal anomaly.

In the embodiment shown in FIG. 2, the elements thereof are interconnected by a network(s) 201. However, in other embodiments, other types of connections can also be used. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

FIG. 3 shows a high-level block/flow diagram of an exemplary causal anomaly ranking system/method 300, in accordance with an embodiment of the present invention.

The system/method 300 includes a set of single time point rankers 310 and a temporal smoother 320. Each of the single time point rankers 310 includes an invariance graph 311, broken invariance pairs 312, random walk propagator 313, a reconstruction error determiner 314, and an optimizer 315.

Each of the single time point rankers 310 performs ranking on an individual time point. That is, each of the outputs of the set of single time point rankers 311 corresponds to a particular time point (e.g., result at time t, result at time t+1, . . . , result at time T.

The random walk propagator 313 perform a random walk with re-start to model the propagation process from a few seed anomalies to the whole invariance graph 311.

The reconstruction error determiner 314 models the reconstruction error of the propagated anomalies and the broken invariance pairs 312.

The optimizer 315 performs an iterative optimization algorithm to compute the sparse, causal anomaly vector.

The temporal smoother 320 is used to enforce the smoothness of the ranking result at adjacent time points, so as to improve the global consistency of the ranking results.

Further regarding the random walk propagator 313, a random walk with restart (RWR) technique is used to model the potential propagation. Assuming e denotes the indicator vector, in which ei indicates if the corresponding node in the invariant network is casual anomaly or not. We set its corresponding entry ei to 1 for all casual anomaly nodes, and all other entries to 0. Then, the abnormal status of e will propagate other nodes with following objective function:

$$\min_{r\geq 0} c \sum_{i,j=1}^{n} A_{ij} \left\| \frac{1}{\sqrt{D_{ii}}} r_i - \frac{1}{\sqrt{D_{jj}}} r_j \right\|^2 + (1-c) \sum_{i=1}^{n} \|r_i - e_i\|^2$$

$$\min_{r\geq 0} c r^T (I_n - \tilde{A}) r + (1-c) \|r - e\|_F^2$$

Here, matrix A is the adjacency of the invariant network, D is the diagonal degree matrix of A, c is a scalar controlling the weight between the strength of propagation, and r is the propagation result vector, and e is the initial seeds of anomalies which are truly responsible for subsequent broken invariances. The converged solution of r can be written as follows:

$$r = (1-c)(I_n - c\tilde{A})^{-1} e$$

Further regarding the reconstruction error determiner 314, after the initial seeds vector e is propagated on the invariance network, it will lead to the broken invariance pairs 312; this is because in abnormal conditions, two previously correlated nodes (or invariance) will be broken in case of anomaly happens, meaning that one or both of the nodes have intrinsic changes in its state and therefore the two nodes will no longer be synchronized together. The broken invariance pairs 312 have been recorded in the graph whose adjacency matrix is $\tilde{P}$. Here, if the ith and jth node are no longer correlated, then the corresponding entry in $\tilde{P}$ will be 1; or else it will be zero. We measure the reconstruction error as follows:

$$\min_{e_i \in \{0,1\}, 1\leq i\leq n} \|(Bee^T B^T) \circ M - \tilde{P}\|_F^2$$

Further regarding the optimizer 315, by combining the random walk propagator 313 and the reconstruction error determiner 314, we can have a global optimization framework as follows:

$$\min_{e\geq 0} \|(Bee^T B^T) \circ M - \tilde{P}\|_F^2 + \tau \|e\|_1$$

Here, the optimization variable is e, and we have two terms. The first term requires that the propagated anomaly should be consistent with the broken invariance (i.e., reconstruction of the broken pairs); the second term is a penalization term on the l1-norm of the variable e, which encourages many zero entries in the vector e. This optimization problem can be computed using the following iteration:

$$e \leftarrow e \circ \left\{ \frac{4[(B^T \tilde{P}) \circ M] Be}{4[(B^T Bee^T B^T) \circ M] Be + \tau 1_n} \right\}^{\frac{1}{4}}$$

Further regarding the temporal smoother 320, in anomaly detection a reasonable assumption is that as time goes by, the anomalies may propagate in the invariant network. However, within a time period T, the root casual anomalies usually remain unchanged. Based on this intuition, we develop a smoothing method by jointly considering temporal and dynamical broken networks. That is we add a smoothing term to the objective functions. Here, e(i−1) and e(i) are the causal anomaly ranking vectors of two continues time points. Then, the objective function can be written as follows:

$$\min_{e^{(i)} \geq 0, 1 \leq i \leq T} \sum_{i=1}^{T} \left[ \|(Be^{(i)}(e^{(i)})^T B^T) \circ M - \tilde{P}\|_F^2 + \tau \|e^{(i)}\|_1 \right] + \alpha \|e^{(i)} - e^{(i-1)}\|_2^2$$

We can define an iterative optimization procedure as follows:

$$e^{(i)} \leftarrow e^{(i)} \circ \left\{ \frac{4[(B^T \tilde{P}) \circ M] Be + 2\alpha e^{(i-1)}}{4[(B^T Bee^T B^T) \circ M] Be + \tau 1_n + 2\alpha e^{(i)}} \right\}^{\frac{1}{4}}$$

A description will now be given regarding traditional methods and some of the differences between the traditional methods versus the present invention.

Traditional methods typically use neural networks to estimate the input and output mapping functions, which requires tuning many parameters and can get stuck in local optimal solution. We used a manifold regularized kernel regression framework that can provide a global optimal solution and makes it more convenient to locate the control parameter in the optimal KPI values. Another difference is that we use a data-driven, mathematical method to separate variables that cannot be very well explained by the input variables, which can improve the online optimization. Traditional methods typically do not identify such variables from the input data.

FIG. 4 shows a flow diagram of an exemplary method 400 for causal anomaly ranking, in accordance with an embodiment of the present invention.

At step 405, model anomaly propagation in the invariant network. In an embodiment, the anomaly propagation in the invariant network is modeled using a random walk with restart technique. In an embodiment, the anomaly propagation in the invariant network is modeled using an objective function that is based on an anomaly weight vector after a propagation of an initial fault in the causal anomaly ranking vectors. In an embodiment, the anomaly propagation in the invariant network is modeled based on a threshold applied to a triple formed from a first degree of an AutoRegressive eXogenous (AXR) model, a second degree of the AXR model, and a time delay between the time series data.

At step 410, reconstruct broken invariant links in an invariant graph based on causal anomaly ranking vectors. Each broken invariant link involves a respective node pair formed from the plurality of nodes such that one of the nodes in the respective node pair has an anomaly. Each causal anomaly ranking vector indicates a respective node anomaly status for a given one of the plurality of nodes when paired. In an embodiment, the broken invariant links are identified based on an objective function.

At step 415, determine a reconstruction error for the invariant network based on the broken invariant links.

At step 420, determine the set of time-dependent anomaly rankings based on the reconstruction error.

At step 425, calculate a sparse penalty of the casual anomaly ranking vectors to obtain a set of time-dependent anomaly rankings. In an embodiment, the sparse penalty of the casual anomaly ranking vectors is used to control a number of non-zero values in the set of time-dependent anomaly rankings.

At step 430, optimize the set of time-dependent anomaly rankings. In an embodiment, the set of time-dependent anomaly rankings are optimized using an objective function. In an embodiment, the objective function has (i) a first term requiring consistency between a propagated anomaly and a broken invariant link and (ii) a second term that is a penalization term for encouraging zero entries in the causal anomaly ranking vectors.

At step 435, perform temporal smoothing of the set of time-dependent anomaly rankings.

At step 440, control an anomaly-initiating one of the plurality of nodes based on the set of time-dependent anomaly rankings. In an embodiment, the control can involve powering down a root cause computer processing device at the anomaly-initiating one of the plurality of nodes to mitigate an error propagation therefrom. In an embodiment, the control can involve terminating a root cause process executing on a computer processing device at the anomaly-initiating one of the plurality of nodes to mitigate an error propagation therefrom.

A description will now be given regarding system invariants and vanishing correlations, in accordance with an embodiment of the present invention.

A framework is described for discovering pairwise correlations in massive time series. The correlations on normal system stage are referred to as system invariant. Each correlation is referred to as an invariant link. Then, the method to detect vanishing correlations during system abnormal stage is described. Herein, these vanishing correlations are also referred to as broken invariant links.

An invariant model will now be described, in accordance with an embodiment of the present invention.

An invariant is a model describing a pairwise relationship between time series expressed as an AutoRegressive eXogenous (ARX) model considering the time delay. Let x(t) and y(t) be the observed values from time series x and y at time t respectively, n and m be the degrees of the ARX model, and k be the time delay. Let $\hat{y}(t; \theta)$ be the estimate of y(t) with the ARX model parameterized by $\theta$. It can be expressed as follows:

$$\hat{y}(t; \theta) = \qquad\qquad\qquad (1)$$
$$a_1 y(t-1) + \ldots + a_n y(t-n) + b_o x(t-k) + \ldots + b_m x(t-k-m) + d$$
$$= \varphi(t)^T \theta, \qquad\qquad\qquad (2)$$

where $\theta = [a_1, \ldots, a_n, b_o, \ldots, b_m, d]^T \in \mathbb{R}^{n+m+2}$, $\varphi(t) = [y(t-1), \ldots, y(t-n), x(t-k), \ldots, x(t-k-m), 1]^Y \in \mathbb{R}^{n+m+2}$.

TABLE 1

Summary of notations

| Symbol | Definition |
|---|---|
| n | the number of nodes in the invariant graph |
| c, λ, τ | the parameters $0 < c < 1, \tau > 0, \lambda > 0$ |
| σ(*) | the softmax function |
| $G_I$ | the invariant network |
| $G_b$ | the broken network for $G_I$ |
| A (Ã) $\in \mathbb{R}^{n \times n}$ | the (normalized) adjacency matrix of $G_I$ |
| P (P̃) $\in \mathbb{R}^{n \times n}$ | the (normalized) adjacency matrix of $G_b$ |
| M $\in \mathbb{R}^{n \times n}$ | the logical matrix of $G_I$ |
| d(i) | the degree of the $i^{th}$ node in graph $G_I$ |
| D $\in \mathbb{R}^{n \times n}$ | the degree matrix: D = diag(d(i), . . . , d(n)) |
| r $\in \mathbb{R}^{n \times 1}$ | the anomaly weight vector |
| e $\in \mathbb{R}^{n \times 1}$ | the ranking vector of causal anomalies |

For a fixed (n, m, k), the parameter $\theta$ can be estimated with all the observed time points t=1, . . . , N in the training time series by the least squares. In practice, only 'good' ARX models should be used for anomaly detection, so the 'goodness of fit' of an ARX model is defined. Herein, a fitness score F($\theta$) is used, which is defined as follows:

$$F(\theta) = 1 - \sqrt{\frac{\sum_{t=1}^{N} |y(t)\hat{y}(t; \theta)|^2}{\sum_{t=1}^{N} |y(t) - \bar{y}|^2}}, \qquad (3)$$

where $\bar{y}$ is the average of all the observed values y(t). F($\theta$) is always less than 1 and a higher F($\theta$) indicates that the ARX model fits the observed data well. If a threshold is specified and the fitness score of an ARX model for x and y is greater than the threshold, it is declared that there exists an invariant (correlation) between them. The network includes all the invariant links encoding the pair-wise correlationships is referred to as the invariant network. This procedure of building system invariant network is referred to as the model training period. The inferred $\theta$ will be used to dynamically track vanishing correlations between each pair of time series during testing period.

A description will now be given regarding detecting vanishing correlations, in accordance with an embodiment of the present invention.

To detect the vanishing correlations during system abnormal stage, the simplest approach for ARX model selection is to consider all possible combinations of (m, n, k) within a prefixed ranges, and select the model with the highest fitness score. In real-world applications such as anomaly detection in physical systems, 0≤n, m, k≤2 is popularly used.

The invariant built with the method described herein is used to track vanishing correlations in real time through the following procedure. At each time point, we compute the (normalized) residual R(t) between the measurement y(t) and its estimate ŷ(t; θ) defined by the following:

$$R(t) = \frac{|y(t) - \hat{y}(t; \theta)|}{\varepsilon_{max}} \quad (4)$$

where $\varepsilon_{max}$ is the maximum error in training ARX models, i.e., $\varepsilon_{max}$ max$_{1\leq t\leq n}|y^{(t)}-\hat{y}(t;\theta)|$. If the residual exceeds a prefixed threshold, then the invariant is declared as 'broken', i.e., the correlation between the two time series is vanishing. The network includes all the vanishing correlations of the system is referred to as the broken network. This procedure of tracking system broken network is referred to as the testing period.

A description will now be given of a problem addressed by the present invention.

Let $G_1$ be the invariant network (graph$^2$) containing n nodes, and $G_b$ be the broken network for $G_1$. Two symmetric matrices A∈$\mathbb{R}^{n\times n}$, P∈$\mathbb{R}^{n\times n}$ are used to denote $\mathbb{R}$ the adjacency matrix of network $G_1$ and $G_b$ respectively. These two networks can be obtained using the techniques introduced herein. The values of the two matrices can be either binary or real values. For the binary case, 1 is used to denote there exists a correlation between two corresponding time series, while 0 means no correlation. For the real value case, for example, the fitness score F(θ) and the residual R(t) can be used as the values of the two matrices, respectively.

Our goal is to detect causal abnormal nodes in $G_1$ that are most likely to produce the broken status in $G_b$. Herein, the present invention provides effective algorithms to rank the nodes so that the top-ranked nodes are most likely the causal anomalies. The ranking vector of the causal anomalies is denoted as e. Important notations are listed in Table 1.

A description will now be given regarding ranking causal anomalies algorithm, in accordance with an embodiment of the present invention.

In particular, an algorithm for Ranking Causal Anomalies (RCA) is described. The causal anomaly ranking is modeled as the reconstruction error minimization problem. The proposed RCA method simultaneously optimizes the empirical likelihood of the broken network and also takes into account the fault propagation in the invariant network.

A description will now be given regarding an objective function used by one or more embodiments of the present invention.

It is impractical to pinpoint the causal anomalies at the earliest time point due to various system fault behaviors, system noises, data uncertainties and so on. To alleviate this problem, the random walk with restart (RWR) technique is used to model the fault propagation in the invariant network. Assuming e denotes the indicator vector, in which $e_i$ (1≤i≤n) indicates if the corresponding node in the invariant network is a casual anomaly or not. Entry $e_i$ is set to 1 for all casual anomaly nodes, and 0 other wise. Then the abnormal status e will propagate to other nodes with the following the objective function:

$$\min_{r\geq 0} c \sum_{i,j=1}^{n} A_{ij} \left\| \frac{1}{\sqrt{D_{ii}}} r_i - \frac{1}{\sqrt{D_{jj}}} r_j \right\|^2 + (1-c) \sum_{i=1}^{n} \|r_i - e_i\|^2 \quad (5)$$

where D∈$\mathbb{R}^{n\times n}$ is the degree matrix of A, c∈(0, 1) is the regularization parameter, and r is the anomaly weight (score) vector after the propagation of initial fault in e. Equation 5 is equivalent to the following formula:

$$\min_{r\geq 0} cr^T(I_n - \tilde{A})r + (1-c)\|r - e\|_F^2 \quad (6)$$

where $\tilde{A}$ is the normalized A and is equal to D-½ AD-½. Similarly, the normalization of P is denoted as $\tilde{P}$. The first term in Equation 6 is the smoothness constraint, which means that a good ranking function should not change too much between nearby points in the invariant network. The second term is the fitting constraint, which means a good ranking function should not change too much from the initial anomaly assignment. The trade-off between these two competing constraints is controlled by a positive parameter c. Since $\tilde{A}$ is stochastic, Equation 6 will converge at a stationary point r with the following formula:

$$r=(1-c)(I_n-c\tilde{A})^{-1}e \quad (7)$$

To encode the information of a broken network, r is used to reconstruct the broken network. If there exists a broken link in $G_b$, e.g., $\tilde{P}_{ij}\neq 0$, then ideally at least one of the nodes i and j is abnormal. Note that it is not necessary the causal anomaly, it might be the downstream fault caused by potential causal anomalies. To this end, either $r_j$ or $r_i$ should be large. Thus, the product of $r_i$ and $r_j$ can be used to reconstruct the value of $\tilde{P}_{ij}$. Hereinafter, a procedure is described to normalize them to avoid extreme values. Then, the loss of reconstructing the broken link $\tilde{P}_{ij}$ can be calculated by $(r_i \cdot r_j - \tilde{P}_{ij})^2$. Thus, the reconstruction error for the whole broken network is $\|(rr^T)\circ M - \tilde{P}\|_F^2$. Here, ○ is elementwise operator, and M is the logical matrix of the invariant network $G_1$ (1 with edge, 0 without edge). Let B=(1-c)$(I_n-c\tilde{A})^{-1}$, substituting r to the reconstruction error formula, the following objective function is obtained:

$$\min_{e_i\in\{0,1\},1\leq i\leq n} \|(Bee^TB^T)\circ M - \tilde{P}\|_F^2 \quad (8)$$

Considering that the integer programming in Equation 8 is hard to solve and our goal is to rank the causal anomalies, we relax it by using the $l_1$ penalty on e with parameter τ to control the number of non-zero entries in e. Then, the following objective function is obtained:

$$\min_{e\geq 0} \|(Bee^TB^T)\circ M - \tilde{P}\|_F^2 + \tau\|e\|_1 \quad (9)$$

A description will now be given regarding a learning algorithm, in accordance with an embodiment of the present invention.

An iterative multiplicative updating algorithm is provided herein to optimize the objective function in Equation 9. The objective function is invariant under these updates if and only if e is at a stationary point. Specifically, the solution to the optimization problem in Equation 9 is based on the following theorem, which is derived from the Karush-Kuhn-Tucker (KKT) complementarity condition.

Theorem 1. Updating e according to Equation 10 will monotonically decrease the objective function in Eq. 9 until convergence.

$$e \leftarrow e \circ \left\{ \frac{4[(B^T \tilde{P}) \circ M] Be}{4[(B^T Bee^T B^T) \circ M] Be + \tau 1_n} \right\}^{\frac{1}{4}} \quad (10)$$

where $\circ$, $[\bullet]/[\bullet]$ and $(\bullet)^{1/4}$ are element-wise operators.

Based on Theorem 1, we develop the iterative multiplicative updating algorithm for optimization and summarize it in Algorithm 1. This ranking algorithm is referred to herein as RCA.

---
Algorithm 1: Ranking Causal Anomalies (RCA)
---
Input: Network $G_I$ denoting the logical invariant network with n nodes, and is represented by an adjacency matrix A, c random walk parameter, $\lambda$ is the parameter for breaking network, $\tau$ to for the sparsity of e, $\tilde{P}$ is the normalized adjacency matrix of breaking network, M is the logical matrix of network $G_I$ (1 with edge, 0 without edge)
Output: Ranking vector e
1  begin
2    for i ← 1 to n do
3      $D_{ii} \leftarrow \Sigma_{j=1}^n A_{ij}$;
4    end
5    D ← diag($D_{11}, ..., D_{ii}$);
6    $\tilde{A} \leftarrow D^{-1/2} A D^{-1/2}$;
7    for $\pi$ ← 1 to d do
8      Initialize e with random values between (0,1];
9    end
10   B ← $(1-c)(I_n - c\tilde{A})^{-1}$;
11   repeat
12     Update e by Equation (10);
13   until convergence;
14 end
---

A description will now be given regarding a theoretical analysis, in accordance with an embodiment of the present invention.

Initially, a derivation will be described as follows.

The solution to Equation (10) is derived following the constrained optimization theory. Since the objective function is not jointly convex, an effective multiplicative updating algorithm is adopted for optimization to find a locally optimal solution. Theorem 1 is proven as follows. We formulate the Lagrange function for optimization $L = \|(Bee^T B^T) \circ M - \tilde{P}\|_F^2 + \tau 1_n^T e$. Obviously, B, M and $\tilde{P}$ are symmetric matrices. Let $F = (Bee^T B^T) \circ M$, then we have the following:

$$\frac{\partial}{\partial e_m}(F - \tilde{P})_{ij}^2 = 2(F_{ij} - \tilde{P}_{ij})\frac{\partial F_{ij}}{\partial e_m} \quad (11)$$

$$= 4(F_{ij} - \tilde{P}_{ij})M_{ij}(B_{mi}^T B_j : e)(\text{by symmetry})$$

$$= 4 B_{mi}^T (F_{ij} - \tilde{P}_{ij}) M_{ij}(Be)_j:.$$

It follows that $$\frac{\partial \|F - \tilde{P}\|_F^2}{\partial e_m} = 4 B_{m:}^T [(F - \tilde{P}) \circ M](Be), \quad (12)$$

and thereby:

$$\frac{\partial \|F - \tilde{P}\|_F^2}{\partial e} = 4 B^T [(F - \tilde{P}) \circ M](Be). \quad (13)$$

Thus, the partial derivative of Lagrange function with respect to e is as follows:

$$\nabla_e L = 4 B^T [(Bee^T B^T - \tilde{P}) \circ M] Be + \tau 1_n \quad (14)$$

where $1_n$ is the n×1 vector of all ones. Using the Karush-Kuhn-Tucker (KKT) complementarity condition for the non-negative constraint on e, the following results:

$$\nabla_e L \circ e = 0 \quad (15)$$

The above formula leads to the updating rule for e that is shown in Equation 10.

A description will now be given regarding convergence, in accordance with an embodiment of the present invention.

The auxiliary function approach is used to prove the convergence of Equation (10) in Theorem 1. The definition of auxiliary function is introduced as follows:

Definition 4.1. Z (h, ĥ) is an auxiliary function for L(h) if the following conditions are satisfied for any given h, ĥ:

$$Z(h, \hat{h}) \geq L(h) \text{ and } Z(h, h) = L(h) \quad (16)$$

Lemma 4.1. If Z is an auxiliary function for L, then L is non-increasing under the update.

$$h^{(t+1)} = \arg\min_h Z(h, h^{(t)}) \quad (17)$$

Theorem 2. Let L(e) denote the sum of all terms in L containing e. The following function is an auxiliary function for L(e):

$$Z(e, \hat{e}) = -2 \sum_{ij} \hat{e}_i \{[(B^T \tilde{P}) \circ M] B\}_{ij} \hat{e}_j \left(1 + \log \frac{e_i e_j}{\hat{e}_i \hat{e}_j}\right) + \quad (18)$$

$$\sum_i \{[(B^T B \hat{e} \hat{e}^T B^T) \circ M] B \hat{e}\}_i \frac{e_i^4}{\hat{e}_i^3} + \frac{T}{4} \sum_i \frac{e_i^4 + 3 \hat{e}_i^4}{\hat{e}_i^3}$$

Furthermore, it is a convex function in e and has a global minimum.

Theorem 2 can be proved by validating Z (e, ê) ≥ L(e), Z(e, e) = L(e), and the Hessian matrix $\nabla \nabla_e Z$ (e, ê) ≥ 0.

Based on Theorem 2, Z(e, ê) can be minimized with respect to e with ê fixed. We set $\nabla_e Z(e, \hat{e}) = 0$, and get the following updating formula:

$$e \leftarrow \hat{e} \circ \left\{ \frac{4[(B^T \tilde{P}) \circ M] B \hat{e}}{4[(B^T B \hat{e} \hat{e}^T B^T) \circ M] B \hat{e} + \tau 1_n} \right\}^{\frac{1}{4}} \quad (19)$$

which is consistent with the updating formula derived from the aforementioned KKT condition.

From Lemma 4.1 and Theorem 2, for each subsequent iteration of updating e, we have the following: $L(e^0) = Z(e^0, e^0) \geq Z(e^1, e^0) \geq Z(e^1, e^1) = L(e^1) \geq \ldots \geq L(e^{Iter})$. Thus, L(e) monotonically decreases. Since the objective function Equation (9) is lower bounded by 0, the correctness of Theorem 1 is proved. Theorem 1 can be proven with a similar strategy.

A complexity analysis will now be described, in accordance with an embodiment of the present invention.

In Algorithm 1, we need to calculate the inverse of n×n matrix, which is with complexity $O(n^3)$. In each iteration, the multiplication between two n×n matrix is inevitable, thus the overall time complexity of Algorithm 1 is $O(Iter \cdot n^3)$ where Iter is the number of iterations needed before convergence. Hereinafter, another algorithm is proposed that avoids calculation of the inverse of n×n matrix and the multiplication between two n×n matrix. The time complexity can be reduced to $O(Iter \cdot n^2)$.

A description will now be given of a computational speedup, in accordance with an embodiment of the present invention.

From the analysis described herein before, it has been determined that the time complexity of Algorithm 1 is $O(Iter \cdot n^3)$. Another algorithm is provided that avoids calculation of the inverse of n×n matrix and the multiplication between two n×n matrices. The time complexity can be reduced to $O(Iter \cdot n^2)$. The computational speed up is achieved by relaxing the objective function in Equation 9 to jointly optimize the anomaly weight vector r and the ranking vector of causal anomalies e. The objective function is as follows:

$$\min_{e \geq 0, r \geq 0} cr^T(I_n - \tilde{A})r + (1-c)\|r - e\|_F^2 + \lambda \|(rr^T) \circ M - \tilde{P}\|_F^2 + \tau\|e\|_1 \quad (20)$$

To solve the objective function above, an alternating scheme can be used. That is, we optimize the objective with respect to r while fixing e, and vice versa. This procedure continues until convergence. The objective function is invariant under these updates if and only if r, e are at a stationary point. Specifically, the solution to the optimization problem in Equation 20 is based on the following theorem, which is derived from the Karush-Kuhn-Tucker (KKT) complementarity condition. The derivation of it and the proof of Theorem 3 is similar as that of Theorem 1.

Theorem 3. Alternatively updating e and r according to Eq. 21 and Eq. 22 will monotonically decrease the objective function in Eq. 20 until convergence.

$$r \leftarrow r \circ \left\{ \frac{\tilde{A}r + 2\lambda(\tilde{P} \circ M)r + (1-c)e}{r + 2\lambda[(rr^T) \circ M]r} \right\}^{\frac{1}{4}} \quad (21)$$

$$e \leftarrow e \circ \left[ \frac{2(1-c)r}{\tau 1_n + 2(1-c)e} \right]^{\frac{1}{2}} \quad (22)$$

Based on Theorem 3, we can develop the iterative multiplicative updating algorithm for optimization similar as Algorithm 1. This ranking algorithm is referred to as R-RCA. From Equation 21 and Equation 22, it can be observed that the calculations of the inverse of n×n matrix and the multiplication between two n×n matrices in Algorithm 1 are successfully avoided. However, the parameter space is doubled. The relaxation effectively improves the computational performance.

A softmax normalization will now be described, in accordance with an embodiment of the present invention.

Herein, we use the product of the ranking value of two nodes i and j, $r_i \cdot r_j$, as the strength of evidence that the edge between these two nodes is vanishing (broken). However, it suffers from the extreme values or outliers in the ranking values r. To reduce the influence of extreme values or outliers in the data without removing them from the dataset, softmax normalization is used on the ranking values r. Thus, the ranking values are nonlinearly transformed using the sigmoidal function before the multiplication of the two ranking values. Thus, the reconstruction error is $\|(\sigma(r)\sigma(r)^T) \circ M - \tilde{P}\|_F^2$, and $\sigma(\cdot)$ is the softmax function with the following:

$$\sigma(r)_i = \frac{e^{r_i}}{\sum_{k=1}^{n} e^{r_k}}, (i = 1, \ldots n). \quad (23)$$

The corresponding objective function for Algorithm 1 is modified to the following:

$$\min_{e \geq 0} \|(\sigma(Be)\sigma^T(Be) \circ M - \tilde{P}\|_F^2 + \tau\|e\|_1 \quad (24)$$

Similarly, the objective function for Eq. 20 is modified to the following:

$$\min_{e \geq 0, r \geq 0} cr^T(I_n - \tilde{A})r + (1-c)\|r - e\|_F^2 + \quad (25)$$
$$\lambda \|(\sigma(r)\sigma^T(r)) \circ M - \tilde{P}\|_F^2 + \tau\|e\|_1$$

The optimization of these two objective functions are based on the following two theorems.

Theorem 4. Updating e according to Equation 26 as follows will monotonically decrease the objective function in Equation 24 until convergence:

$$e \leftarrow e \circ \left\{ \frac{4[(B^T \Psi \tilde{P}) \circ M]\sigma(Be)}{4[(B^T \Psi \sigma(Be)\sigma(Be)) \circ M]\sigma(Be) + \tau 1_n} \right\}^{\frac{1}{4}} \quad (26)$$

where $\Psi = \{\text{diag}[\sigma(Be)] - \sigma(Be)\sigma^T(Be)\}$.

Theorem 5. Updating r according to Equation 27 as follows will monotonically decrease the objective function in Equation 25 until convergence:

$$r \leftarrow r \circ \left\{ \frac{\frac{c}{2}\tilde{A}r + \lambda[((\sigma(r)1_n^T) \circ \tilde{P} + \rho\Lambda) \circ M]\sigma(r) + \frac{(1-c)}{2}e}{\frac{1}{2}r + \lambda[((\sigma(r) \circ \sigma(r))\sigma^T(r) + \sigma(r)(\sigma^T(r)\tilde{P})) \circ M]\sigma(r)} \right\}^{\frac{1}{4}} \quad (27)$$

where $\Lambda = \sigma(r)\sigma^T r$ and $\rho = \sigma^T(r)\sigma(r)$.

Theorem 4 and Theorem 5 can be proven with a similar strategy as that of Theorem 1. The ranking algorithms with softmax normalization are referred to as RCA-SOFT and R-RCA-SOFT, respectively.

A description will now be given regarding smoothing by temporal and dynamical broken networks, in accordance with an embodiment of the present invention.

As time goes by, the anomalies may propagate in the invariant network. However, within a time period T, the root casual anomalies usually remain unchanged. Based on this intuition, a smoothing method is developed by jointly considering temporal and dynamical broken networks. That is, a smoothing term $\|e^{(t)} - e^{(t-1)}\|_2^2$ is added to the objective functions described previously. Here, $e^{(i-1)}$ and $e^{(i)}$ are the causal anomaly ranking vectors of two continues time points. Then, the objective function of algorithm RCA with temporal broken networks smoothing is shown in Equation 28 as follow:

$$\min_{e^{(i)} \geq 0, 1 \leq i \leq T} \sum_{i=1}^{T} \left[ \left\| (Be^{(i)}(e^{(i)})^T B^T) \circ M - \tilde{P} \right\|_F^2 + \tau \|e^{(i)}\|_1 \right] + \alpha \|e^{(i)} - e^{(i-1)}\|_2^2 \quad (28)$$

The updating formula of Equation 28 can be derived as follows:

$$e^{(i)} \leftarrow e^{(i)} \circ \left\{ \frac{4\left[(B^T \tilde{P}) \circ M\right] Be + 2\alpha e^{(i-1)}}{4\left[(B^T Bee^T B^T) \circ M\right] Be + \tau 1_n + 2\alpha e^{(i)}} \right\}^{\frac{1}{4}} \quad (29)$$

The ranking algorithms with temporal network smoothing are referred to as T-RCA, T-R-RCA, T-RCA-SOFT and T-R-RCA-SOFT respectively.

A description will now be given regarding features/advantages of the present invention over conventional approaches.

Existing approaches to detect causal anomalies with invariant network have three common limitations: (1) they do not consider the potential fault propagation in the invariant network; (2) the ranking scoring policy they used is not a good evidence of causal anomaly; and (3) they are unable to jointly consider the temporal and dynamical broken networks which are recognized to be beneficial for denoising. Our approach overcomes these limitations by explicitly considering the propagation of the initial, seed anomalies using the restarted random-walk model, as well as enforcing the anomalies across adjacent time stamps to be temporally smooth.

A description will now be given regarding competitive/commercial values of the solution achieved by the present invention.

The present invention can improve the accuracy of detecting truly causal anomalies in large systems, such as the power plant, clouds, manufacturing lines, computer network systems, and so on. By identifying the most important anomaly, human operators can save great effort in debugging, maintenance, repair of large physical systems. This can increase the running time of large systems and therefore the output.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for root cause anomaly detection in an invariant network having a plurality of nodes that generate time series data, the method comprising:
    modeling, by a processor, anomaly propagation in the invariant network;
    reconstructing, by the processor, broken invariant links in an invariant graph based on causal anomaly ranking vectors, each of the broken invariant links involving a respective node pair formed from the plurality of nodes such that one of the nodes in the respective node pair has an anomaly, each of the causal anomaly ranking vectors for indicating a respective node anomaly status for a given one of the plurality of nodes when paired;
    calculating, by the processor, a sparse penalty of the casual anomaly ranking vectors to obtain a set of time-dependent anomaly rankings;
    performing, by the processor, temporal smoothing of the set of time-dependent anomaly rankings; and
    controlling, by the processor, an anomaly-initiating one of the plurality of nodes based on the set of time-dependent anomaly rankings.

2. The computer-implemented method of claim 1, wherein the anomaly propagation in the invariant network is modeled using a random walk with restart technique.

3. The computer-implemented method of claim 1, wherein the anomaly propagation in the invariant network is modeled based on a threshold applied to a triple formed from a first degree of an AutoRegressive eXogenous (AXR) model, a second degree of the AXR model, and a time delay between the time series data.

4. The computer-implemented method of claim 1, wherein the sparse penalty of the casual anomaly ranking vectors is used to control a number of non-zero values in the set of time-dependent anomaly rankings.

5. The computer-implemented method of claim 1, further comprising determining a reconstruction error for the invariant network based on the broken invariant links, wherein the set of time-dependent anomaly rankings is determined based on the reconstruction error.

6. The computer-implemented method of claim 1, further comprising identifying the broken invariant links based on an objective function.

7. The computer-implemented method of claim 1, wherein the anomaly propagation in the invariant network is modeled using an objective function that is based on an anomaly weight vector after a propagation of an initial fault in the causal anomaly ranking vectors.

8. The computer-implemented method of claim 1, wherein said controlling step comprises powering down a computer processing device at the anomaly-initiating one of the plurality of nodes to mitigate an error propagation therefrom.

9. The computer-implemented method of claim 1, wherein said controlling step comprises selectively terminating a root cause process executing on a computer processing device at the anomaly-initiating one of the plurality of nodes to mitigate an error propagation therefrom.

10. The computer-implemented method of claim 1, further comprising optimizing the set of time-dependent anomaly rankings.

11. The computer-implemented method of claim 10, wherein the set of time-dependent anomaly rankings are optimized using an objective function having a first term requiring consistency between a propagated anomaly and a broken invariant link and a second term that is a penalization term for encouraging zero entries in the causal anomaly ranking vectors.

12. A computer program product for root cause anomaly detection in an invariant network having a plurality of nodes that generate time series data, the computer program product comprising a non-transitory computer readable storage medium having program instructions embodied therewith, the program instructions executable by a computer to cause the computer to perform a method comprising:
    modeling, by a processor, anomaly propagation in the invariant network;
    reconstructing, by the processor, broken invariant links in an invariant graph based on causal anomaly ranking vectors, each of the broken invariant links involving a respective node pair formed from the plurality of nodes such that one of the nodes in the respective node pair has an anomaly, each of the causal anomaly ranking vectors for indicating a respective node anomaly status for a given one of the plurality of nodes when paired;
    calculating, by the processor, a sparse penalty of the casual anomaly ranking vectors to obtain a set of time-dependent anomaly rankings;
    performing, by the processor, temporal smoothing of the set of time-dependent anomaly rankings; and
    controlling, by the processor, an anomaly-initiating one of the plurality of nodes based on the set of time-dependent anomaly rankings.

13. The computer program product of claim 12, wherein the anomaly propagation in the invariant network is modeled based on a threshold applied to a triple formed from a first degree of an AutoRegressive eXogenous (AXR) model, a second degree of the AXR model, and a time delay between the time series data.

14. The computer program product of claim 12, wherein the sparse penalty of the casual anomaly ranking vectors is used to control a number of non-zero values in the set of time-dependent anomaly rankings.

15. The computer program product of claim 12, wherein the method further comprises determining a reconstruction error for the invariant network based on the broken invariant links, wherein the set of time-dependent anomaly rankings is determined based on the reconstruction error.

16. The computer program product of claim 12, wherein the anomaly propagation in the invariant network is modeled using an objective function that is based on an anomaly weight vector after a propagation of an initial fault in the causal anomaly ranking vectors.

17. A computer processing system for root cause anomaly detection in an invariant network having a plurality of nodes that generate time series data, the system comprising:
    a processor, configured to:
        model anomaly propagation in the invariant network;
        reconstruct broken invariant links in an invariant graph based on causal anomaly ranking vectors, each of the broken invariant links involving a respective node pair formed from the plurality of nodes such that one of the nodes in the respective node pair has an anomaly, each of the causal anomaly ranking vectors for indicating a respective node anomaly status for a given one of the plurality of nodes when paired;

calculate a sparse penalty of the casual anomaly ranking vectors to obtain a set of time-dependent anomaly rankings;

perform temporal smoothing of the set of time-dependent anomaly rankings; and control an anomaly-initiating one of the plurality of nodes based on the set of time-dependent anomaly rankings.

* * * * *